(12) United States Patent
Iimura et al.

(10) Patent No.: US 6,555,035 B2
(45) Date of Patent: Apr. 29, 2003

(54) METHOD FOR INJECTION MOLDING

(75) Inventors: Yukio Iimura, Shizuoka-ken (JP); Haruyuki Matsubayashi, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 259 days.

(21) Appl. No.: 09/772,886

(22) Filed: Jan. 31, 2001

(65) Prior Publication Data
US 2001/0023997 A1 Sep. 27, 2001

(30) Foreign Application Priority Data
Mar. 21, 2000 (JP) ........................................ 2000-078312

(51) Int. Cl.⁷ .............................................. B29C 45/76
(52) U.S. Cl. ...................................... 264/40.1; 425/145
(58) Field of Search ............................... 264/40.1, 40.5; 425/145

(56) References Cited

U.S. PATENT DOCUMENTS 5,792,395 A * 8/1998 Ito et al. ..................... 264/40.1

FOREIGN PATENT DOCUMENTS

| JP | 6-61800 | 8/1994 |
|---|---|---|
| JP | 3056215 | 4/2000 |

* cited by examiner

Primary Examiner—Jan H. Silbaugh
Assistant Examiner—Monica A. Fontaine
(74) Attorney, Agent, or Firm—Pillsbury Winthrop LLP

(57) ABSTRACT

The retreat completion position of the screw in the charging step in actual production is controlled based on the result in pilot production as follows. In pilot production, the measurement value Ts of the screw driving torque is integrated with respect to the screw position P from the forward limit to the retreat completion position Ps. When conforming item is produced in the pilot production, the value $\Sigma Ts \cdot dP$ obtained as a result of the integration is stored as a reference value. After actual production begins, the measurement value Tx of the screw driving torque is integrated in real time with respect to the screw position P from the forward limit to the screw position at each time. The obtained value $\Sigma Tx \cdot dP$ is monitored. When this value $\Sigma Tx \cdot dP$ coincides with the reference value $\Sigma Ts \cdot dP$, it is determined that the charging step has been completed, and the retreat operation of the screw is stopped.

16 Claims, 5 Drawing Sheets

METHOD FOR INJECTION MOLDING

CROSS-REFERENCE TO RELATED APPLICATIONS

This application is based upon and claims the benefit of priority from the prior Japanese Patent Application No. 2000-078312, filed Mar. 21, 2000, the entire contents of which are incorporated herein by reference.

BACKGROUND OF THE INVENTION

The present invention relates to a method for injection molding, and more particularly to a method for melting a molding material and storing a constant amount of molten material in a barrel of an injection unit.

An injection unit of an injection molding machine in general has the barrel containing therein a screw for melting a constant amount of molding material and injecting the melted material to a mold. Generally, the molding material is resin formed as pellets, which are stored in a hopper connected to a rear end portion of the barrel. When the screw is rotated in a forward direction within the barrel, the resin is introduced into the barrel from the hopper. The introduced resin is heated and melted. It is supplied to a front end portion of the screw while it is being kneaded, and then successively stored in a top end portion of the barrel. Accordingly, the screw is retreated by the pressure of the molten resin in the top end portion, and the molten resin of an amount substantially corresponding to the retreated distance is stored in the top end portion of the barrel (this step is called a charging step). Then, the molten resin is injected into the mold by moving the screw forward (this step is called an injection step). After the resin is hardened in the mold, the mold is opened and a molded product is taken out.

The amount of the molten resin finally injected into the mold is determined by the position of the screw when the charging step is completed (retreat completion position). Further, the amount of the molten resin varies depending on conditions, such as the temperature in the barrel and the number of revolutions of the screw at a time of introducing the resin in the barrel, and the pressure in the barrel at that time (the back pressure of the screw).

Therefore, to keep the amount of molten resin injected into the mold constant, the temperature in the barrel, the number of revolutions of the screw and the back pressure of the screw are regulated. However, of these conditions, the retreat completion position of the screw is generally fixed for each kind of the molded product.

After the resin in the barrel is completely melted, the properties and the amount of the molten resin injected into the mold are influenced by not only the above conditions but also the manufacturing lot of material resin, the mixture ratio of a recycled material to the material resin, the condition of the screw surface, the condition of internal surface of the barrel and the driving conditions of the screw at the time of injecting the molten resin into the mold. However, since the retreat completion position of the screw is fixed as described above, the amount of the molten resin injected into the mold is varied.

As a conventional technique, a method is known in which the screw retreat speed is controlled to be constant, so that the amount of the molten resin finally injected into the mold may be less varied. However, in this method, since the number of revolutions of the screw is changed to keep the screw retreat speed constant, the back pressure of the screw is varied. Since the number of revolutions of the screw and the back pressure of the screw greatly influence the properties of the molten resin, this method influences the quality of the molded product and therefore is not considered to be preferable. In particular, in the case of injection molding of polyvinyl chloride, decomposition of resin is greatly influenced by the number of revolutions of the screw. Therefore, change in number of revolutions of the screw may cause a serious problem in quality of the molded product.

BRIEF SUMMARY OF THE INVENTION

The present invention was made in consideration of the above problems in the conventional method for controlling the amount of resin introduced and melted in the barrel in an injection molding machine. An object of the present invention is to provide a method for injection molding which can keep the amount and properties of the molten resin finally injected in a mold.

According to the present invention, there is provided a method for injection molding for introducing and melting molding material in a barrel containing a screw, and thereafter injecting the molten material into a mold, the method comprising the steps of:

carrying out pilot production to collect data showing a relationship between a screw retreat distance from a forward limit and screw driving torque when introducing and melting the molding material in the barrel, and integrating the screw driving torque with respect to the screw retreat distance from the forward limit to a retreat completion position of the screw, thereby obtaining a first integral value;

storing as a reference value the first integral value obtained when a conforming item is produced in the pilot production;

carrying out actual production to measure screw driving torque when introducing and melting the molding material, and integrating in real time the screw driving torque with respect to the screw retreat distance from the forward limit to a screw position at each time, thereby obtaining a second integral value; and monitoring the second integral value, when the second integral value coincides with the reference value, determining that the step of introducing the molding material is completed, and stopping a rotation of the screw.

The present inventors discovered the following matters through their researches. When a molding material is melted in a barrel while it is being introduced therein (i.e., in a charging step), if the temperature in the barrel, the number of revolutions of the screw, the back pressure of the screw, the screw geometry, and the other conditions are constant, the rate of increase in amount of the molten resin stored in a top end portion of the barrel is proportional to the screw driving torque at that time. The present invention is based on this discovery. FIG. 1 shows the relationship between the screw driving torque and the amount of the molten resin stored in a unit time in the top end portion of the barrel.

Owing to the above relationship, the amount of the molding material stored in the barrel can be constant at the charging step completion time, if the value (integral value) obtained by integrating the screw driving torque with respect to the retreat distance of the screw is monitored and the retreat complete position of the screw is controlled using the integral value. As a result, the amount of the molding material finally injected into the mold from the barrel is kept constant.

With the method for injection molding of the present invention, it is unnecessary to change the set values of the number of revolutions of the screw and the back pressure of the screw as control parameters. Therefore, if the temperature in the barrel is set to be constant, the properties of the molding material (i.e., the molten resin) finally injected into the mold from the barrel can be kept constant.

In the case of an electric injection molding machine, the screw driving torque is proportional to the current value of an electric motor. In the case of a hydraulic injection molding machine, it is proportional to the driving hydraulic pressure of a hydraulic motor. Therefore, in the above method, the measurement value of the current or the driving hydraulic pressure can be used instead of the screw driving torque.

Immediately after the screw starts retreating, the relationship between the screw driving torque and the rate of increase in amount of the molten resin stored in the top end portion of the barrel is not necessarily stable. Therefore, it is preferable that the calculation of the aforementioned integral value be started not from the forward limit of the screw but from a reference position preset near the forward limit where the screw is retreated from the forward limit by a predetermined distance.

Preferably, when the molding material introduced and melted in the barrel is injected into the mold, the position where the screw advance speed is changed is shifted at each shot with reference to the retreat completion position in the step of introducing the molding material.

In the above method for injection molding, the screw driving torque may be integrated with respect to the elapsed time from the beginning of the retreat of the screw instead of the retreat distance of the screw.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described with reference to the accompanying drawings.

Figure 2:
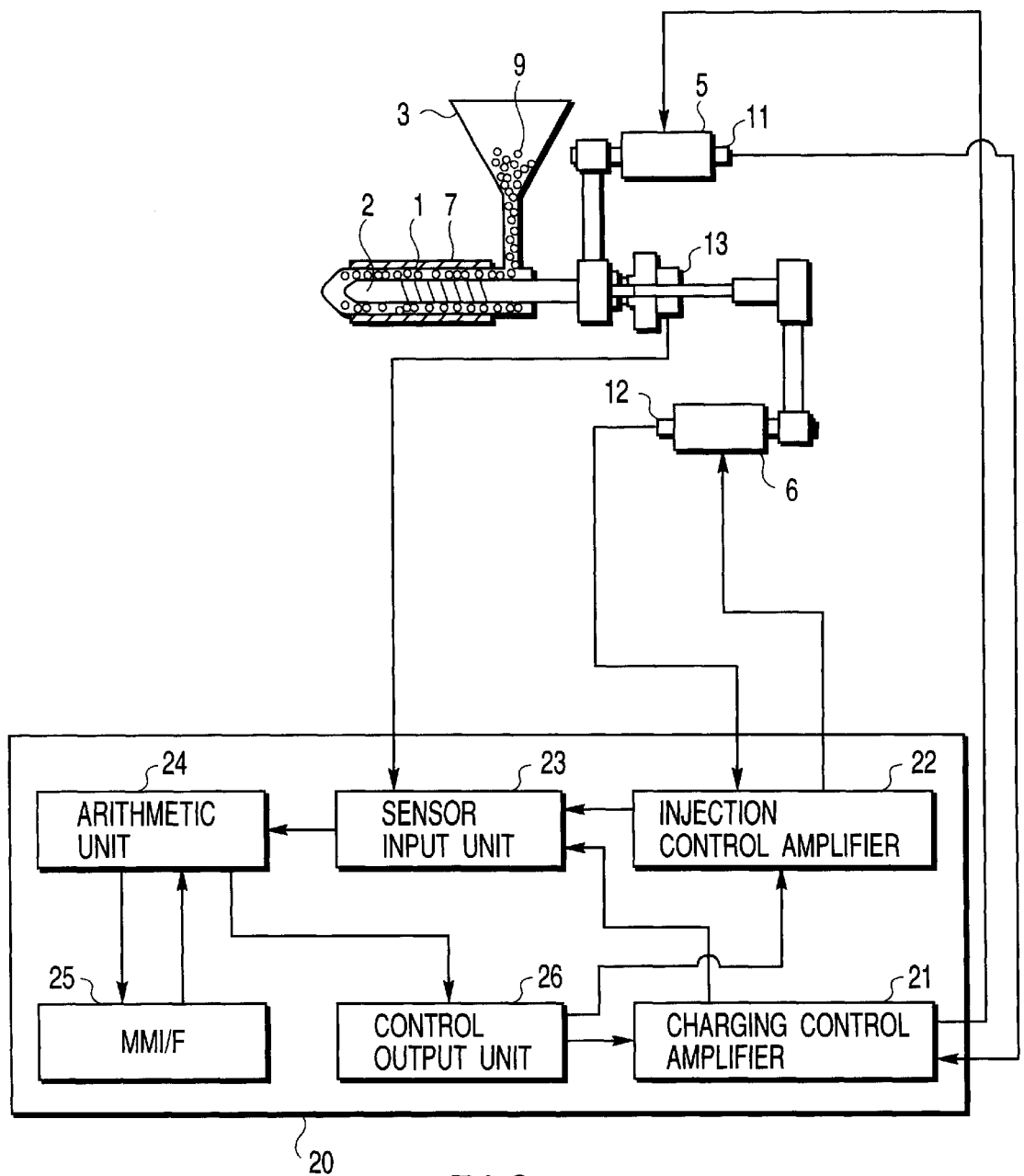
FIG. 2 is a diagram showing an embodiment of the structure of an apparatus and a control system employed in the case where a method for injection molding based on the present invention is applied to an electric injection molding machine.

FIG. 2 shows an embodiment of the schematic structure of an apparatus and a control system employed in the case where a method for injection molding based on the present invention is applied to an electric injection molding machine. In the drawing, a reference numeral 1 denotes a barrel; 2 a screw; 3 a hopper; 5 a motor for charging; and 6 a motor for injection.

The screw 2 is contained in the barrel 1 and a heater 7 is provided around the barrel 1. The hopper 3 is connected to a side near the rear end of the barrel 1 (the right end in the drawing). The top end of the barrel 1 (the left end in the drawing) is connected to a rear surface of a mold (not shown). A molding material 9, i.e., resin formed as pellets, is introduced from the hopper 3 into the barrel 1 and melted therein.

The motor 5 for charging and the motor 6 for injection are connected to the rear end of the screw 2. The motor 5 for charging rotates the screw 2 in the forward direction within the barrel 1 in a charging step. As a result, the resin 9 is introduced into the barrel 1 from the hopper 3. The introduced resin 9 is heated and melted. It is supplied to a front end portion of the screw 2 while it is being kneaded, and then successively stored in the top end portion of the barrel 1. Accordingly, the screw 2 is retreated by the pressure of the molten resin in the top end portion of the barrel 1, and the molten resin of an amount substantially corresponding to the retreated distance is stored in the top end portion of the barrel 1. The motor 6 for injection is used in an injection step to move the screw 2 forward within the barrel 1 and inject the molten resin into the mold (not shown).

A screw rotational number detector 11 for detecting the number of revolutions of the screw 2 is attached to the shaft of the motor 5 for charging. A screw position detector 12 for detecting the position of the screw 2 in the axial direction is attached to the shaft of the motor 6 for injection. A back pressure detector 13 is attached to the rear end of the screw 2. The back pressure detector 13 detects a pressure applied by the screw 2 to the molding material (molten resin) 9 stored in the top end portion of the barrel 1 (back pressure of the screw) from a reaction force exerted on the rear end of the screw 2.

As shown in FIG. 2, a control system 20 of the electric injection molding machine comprises a charging control amplifier 21, an injection control amplifier 22, a sensor input unit 23, an arithmetic unit 24, a man-machine interface 25, and a control output unit 26.

The charging control amplifier 21 collects data on the number of revolutions of the screw 2 detected by the screw rotational number detector 11, controls the movement of the motor 5 for charging and transmits a supply current for the motor 5 for charging to the sensor input unit 23. The injection control amplifier 22 controls the movement of the motor 6 for injection, and transmits to the data input unit 23 data on the position of the screw 2 in the axial direction detected by the screw position detector 12. The sensor input unit 23 transmits to the arithmetic unit 24 data on the back pressure of the screw 2 detected by the back pressure detector 13, the supply current supplied to the motor 5 for charging from the charging control amplifier 21 and the position of the screw 2 in the axial direction supplied from the injection control amplifier 22.

The arithmetic unit 24 calculates screw driving torque from the supply current for the motor 5 for charging. It performs a predetermined operation (in this embodiment, calculation of an integral value of the screw driving torque with respect to the screw retreat distance in the charging step) using the measurement data on the screw position, and displays the results on the man-machine interface 25.

The arithmetic unit 24 determines driving conditions of the screw 2 based on the operation results and instructions input by the operator through the man-machine interface 25, and transmits a command to the control output unit 26. The control output unit 26 transmits control signals to the charging control amplifier 21 and the injection control amplifier 22 respectively to control the movements of the motor 5 for charging and the motor 6 for injection. The method for controlling the retreat completion position of the screw 2 in the charging step will be described later.

Figure 3:
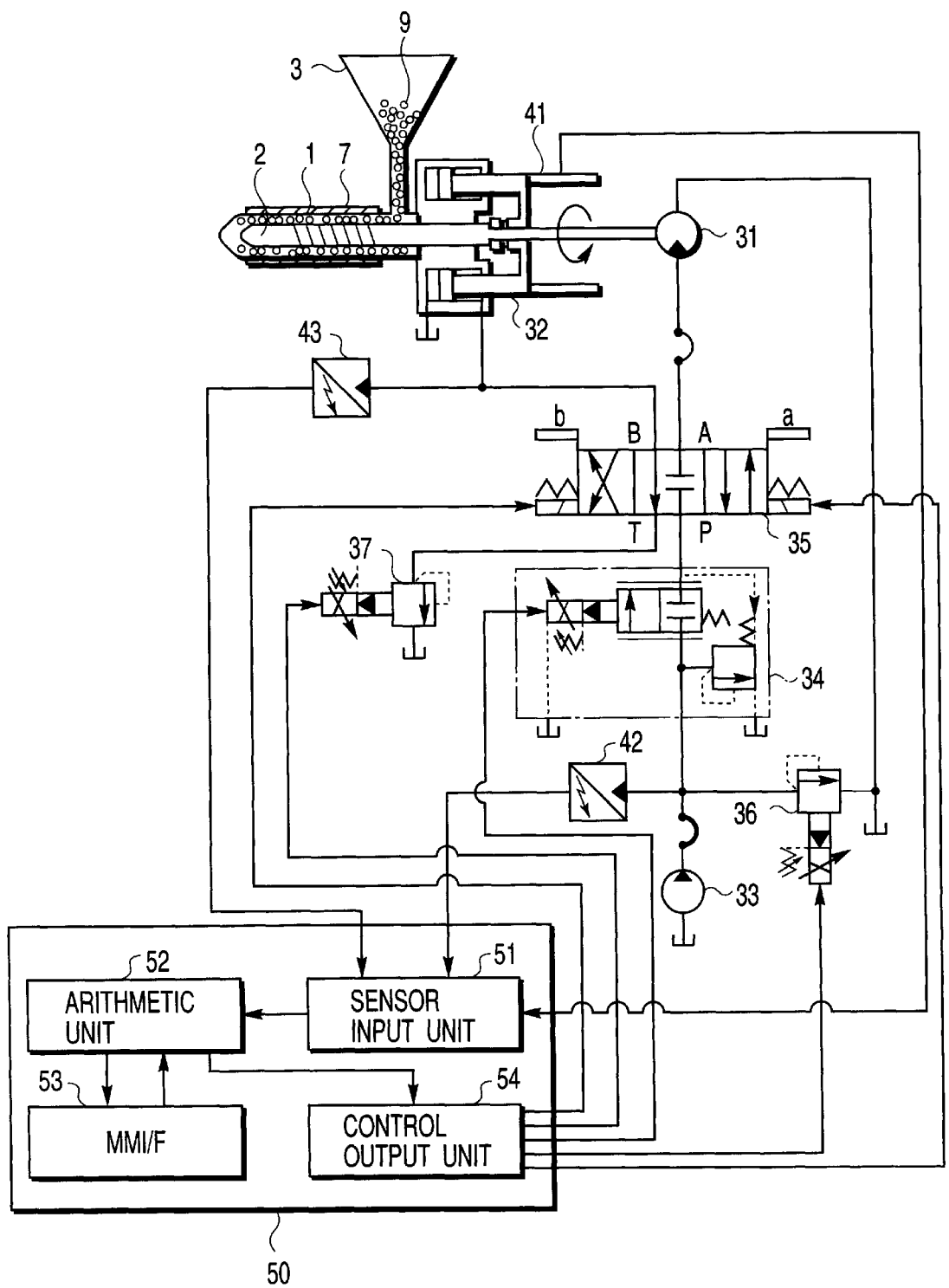
FIG. 3 is a diagram showing an embodiment of the structure of an apparatus and a control system employed in the case where a method for injection molding based on the present invention is applied to a hydraulic injection molding machine.

FIG. 3 shows an embodiment of the structure of an apparatus and a control system employed in the case where a method for injection molding based on the present invention is applied to a hydraulic injection molding machine. In the drawing, a reference numeral 31 denotes a hydraulic motor; 32 a injection ram for applying a back pressure; 41 a screw position detector; 42 a detector for detecting a screw driving hydraulic pressure; and 43 a back pressure detector.

The hydraulic motor 31 and the injection ram 32 are connected to the rear end of the screw 2. Further, the screw position detector 41 for detecting the position of the screw 2 in the axial direction is attached to the rear end portion of the screw 2.

The hydraulic motor 31 rotates the screw 2 in the forward direction within the barrel 1 in a charging step. As a result, resin 9 is introduced into the barrel 1 from the hopper 3. The introduced resin 9 is heated and melted. It is supplied to a front end portion of the screw 2 while it is being kneaded, and then successively stored in the top end portion of the barrel 1. Accordingly, the screw 2 is retreated by the pressure of the molten resin in the top end portion of the barrel 1, and the molten resin of an amount substantially corresponding to the retreated distance is stored in the top end portion of the barrel 1. The injection ram 32 is used in an injection step to move the screw 2 forward within the barrel 1 and inject the molten resin into the mold (not shown).

A hydraulic oil is supplied from a hydraulic pump 33 to a direction control valve 35 through a flow rate control valve 34. The direction control valve 35 supplies the hydraulic oil to the hydraulic motor 31 or the injection ram 32 in accordance with a control signal. The detector 42 for detecting a screw driving hydraulic pressure and a pressure control valve 36 are provided before the flow rate control valve 34. They control the pressure of the hydraulic oil transmitted to the hydraulic motor 31 or the injection ram 32 through the flow rate control valve 34.

The back pressure detector 43 is connected with the hydraulic chamber of the injection ram 32. Further, a pressure control valve 37 is connected with the hydraulic chamber of the injection ram 32 via the direction control valve 35. A line connecting the pressure control valve 37 and the hydraulic chamber of the injection ram 32 is constructed so as to be connected only while the hydraulic motor 31 is being driven (i.e., during the charging step). Thus, the pressure control valve 37 is used to set the back pressure of the screw in the charging step.

As shown in FIG. 3, a control system 50 of the hydraulic injection molding machine comprises a sensor input unit 51, an arithmetic unit 52, a man-machine interface 53, and a control output unit 54.

The sensor input unit 51 transmits to the arithmetic unit 52 data of the position of the screw 2 in the axial direction detected by the screw position detector 41, the pressure of the hydraulic oil detected by the driving hydraulic pressure detector 42 and the back pressure of the screw 2 detected by the back pressure detector 43.

The arithmetic unit 52 calculates screw driving torque from the hydraulic pressure detected by the driving hydraulic pressure detector 42. It performs a predetermined operation (calculation of an integral value) using the measurement data on the screw position, and displays the results on the man-machine interface 53. The arithmetic unit 52 determines driving conditions of the screw 2 based on the operation results and instructions input by the operator through the man-machine interface 53, and transmits a command to the control output unit 54. The control output unit 54 transmits control signals respectively to the flow rate control valve 34, the direction control valve 35, and the pressure control valves 36 and 37 to control the movements of the hydraulic motor 31 and the injection ram 32. The method for controlling the retreat completion position of the screw 2 in the charging step will be described later.

Figure 4:
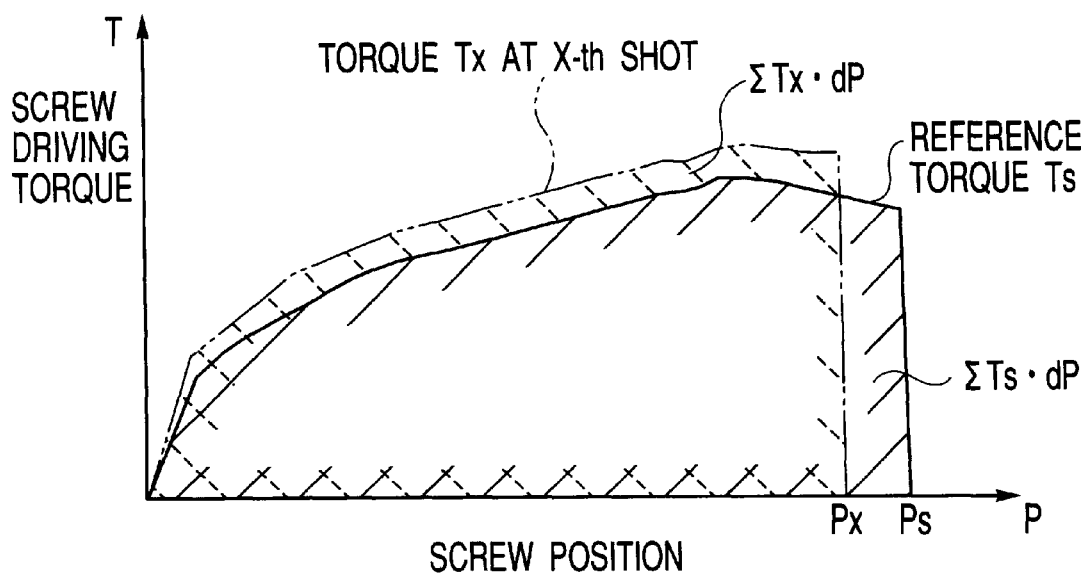
FIG. 4 is a diagram showing a first embodiment of a control method in a charging step.

The principle of the control method based on the present invention in the charging step will be described with reference to FIG. 4. The diagram of FIG. 4 shows an example of data in which the measurement value (T) of screw driving torque in the charging step is plotted with respect to the screw position (P) in the electric injection molding machine shown in FIG. 2 (or the hydraulic injection molding machine shown in FIG. 3). In the diagram, the screw position is represented as a distance from the forward limit of the screw.

In general, when production of a new product is started, preparatory pilot production is carried out in advance to determine suitable conditions for production. In FIG. 4, the solid line represents data showing the relationship between the screw position and the screw driving torque in the charging step in the case where conforming item was obtained in the pilot production. The broken line represents data showing the relationship between the screw position and the screw driving torque at the X-th shot in the charging step in actual production.

In the control method in the charging step based on the present invention, the retreat completion position of the screw in the charging step in actual production is controlled based on the result in the pilot production as follows. In the pilot production, the measurement value (Ts) of the screw driving torque is integrated with respect to the screw position (P) from the forward limit to the retreat completion position (Ps). When conforming item is obtained in the pilot production, the value ($\Sigma Ts \cdot dP$) obtained as a result of the integration is stored as a reference value. After actual production begins, the measurement value (Tx) of the screw driving torque is integrated in real time with respect to the screw position (P) from the forward limit to the screw position at each time. The obtained value ($\Sigma Tx \cdot dP$) is monitored. When this value (ΣTx·dP) coincides with the reference value (ΣTs·dP), it is determined that the charging step has been completed, and the retreat operation of the screw is stopped.

Another embodiment of the control method based on the present invention in the charging step will be described with reference to FIG. 5. In this embodiment, the measurement value (Tx) of the screw driving torque is integrated with respect to the screw position (P) from a position (Po: referred to as a reference position) near the forward limit, where the screw is retreated from the forward limit by a predetermined distance, instead of the forward limit of the screw. This is because, immediately after the screw starts retreating, the relationship between the screw driving torque and the rate of increase in amount of the molten resin stored in the top end portion of the barrel is not necessarily stable, and therefore this portion is excluded from the integral calculation.

In the two embodiments described above, the screw driving torque is integrated with respect to the screw position. However, it may be integrated with respect to the elapsed time from the beginning of the retreat of the screw.

Figure 1:
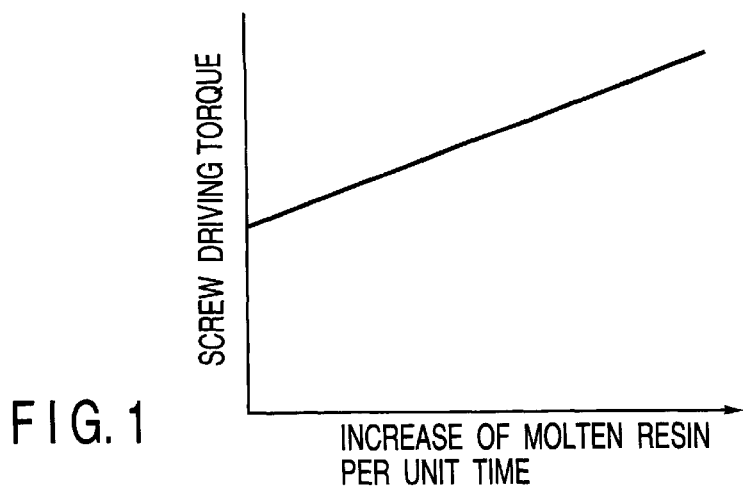
FIG. 1 is a diagram showing the relationship between the screw driving torque and the amount of the molten resin stored within the barrel in a unit time in the charging step.
Figure 6:
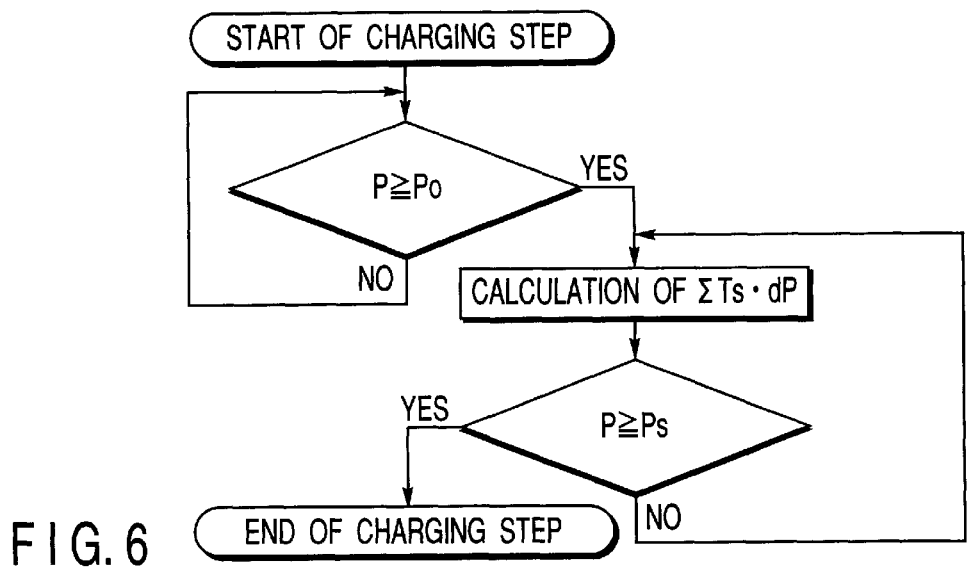
FIG. 6 is a flowchart showing data collection in pilot production in the case where the method shown in FIG. 5 is employed.
Figure 5:
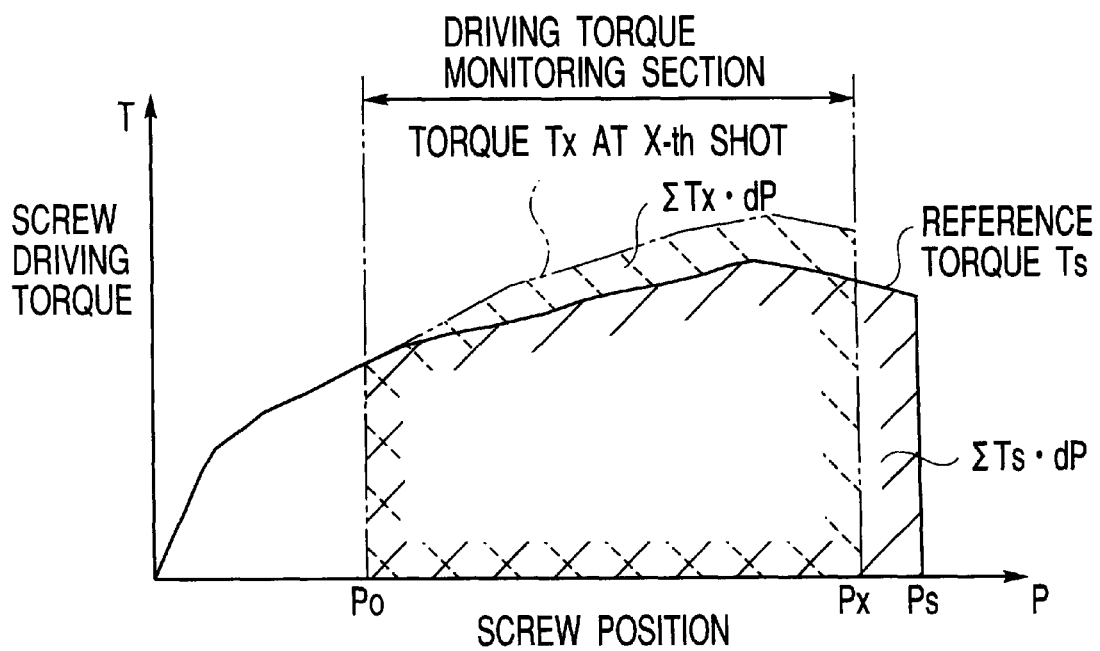
FIG. 5 is a diagram showing a second embodiment of a control method in a charging step.

FIG. 6 is a flowchart showing data collection in pilot production for determining production conditions in the case where the control method shown in FIG. 5 is employed.

In the charging step, when the screw begins to retreat, it is first monitored whether the screw reaches the reference position (Po in FIG. 5) where the integration of the screw driving torque is started. After the screw has reached the reference position (Po), the product of the moved distance (dP) of the screw and the measurement value (Ts) of the screw driving torque and the integral value (ΣTs·dP) thereof are calculated in each split time. At the same time, it is monitored whether the screw reaches the preset retreat completion position (Ps). When the screw has reached the retreat completion position (Ps), the retreat of the screw is stopped, and then the injection step is started. If a conforming item is obtained after repeatedly carrying out pilot production, the integral value (ΣTs·dP) at the retreat completion position (Ps) of the screw is stored as a reference value. The retreat completion position of the screw in the actual production is controlled as follows based on the reference value.

Figure 7:
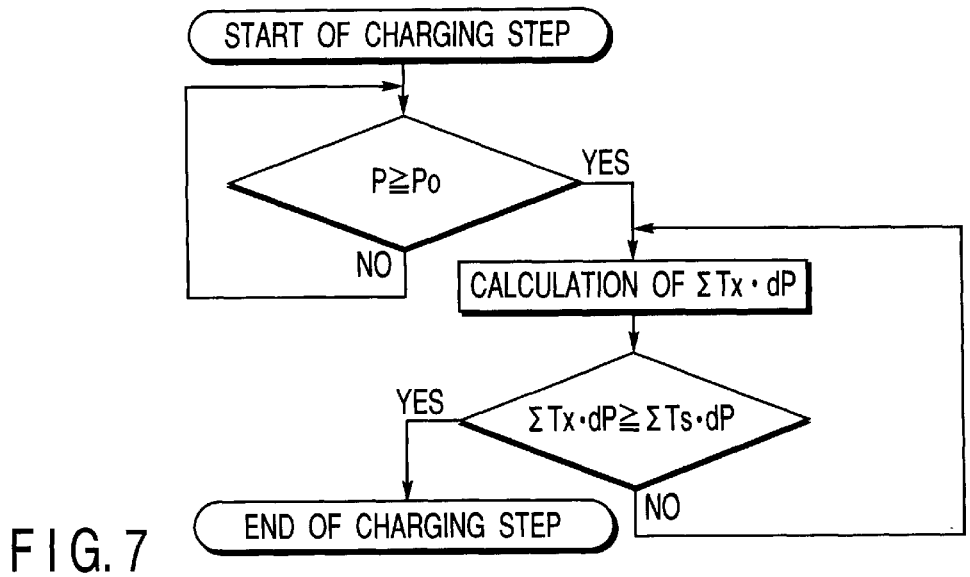
FIG. 7 is a flowchart showing a control method in a charging step in actual production in the case where the method shown in FIG. 5 is employed.

FIG. 7 shows a flow of a control method in actual production in the case where the control method shown in FIG. 5 is employed.

In the charging step, when the screw begins to retreat, it is monitored whether the screw reaches the reference position (Po) where the integration of the screw driving torque is started, as in the case of FIG. 6. After the screw has reached the reference position (Po), the product of the moved distance (dP) and the measurement value (Tx) of the screw driving torque and the integral value (ΣTx·dP) thereof are calculated in each split time. At the same time, it is monitored whether the integral value (ΣTx·dP) reaches the predetermined reference value (ΣTs·dP: FIG. 5). When the integral value (ΣTx·dP) reaches the reference value (ΣTs·dP), the retreat operation of the screw is stopped, and then the injection step is started.

The screw driving torque is proportional to the current value of an electric motor in the case of the electric injection molding machine, to the driving hydraulic pressure of a hydraulic motor in the case of the hydraulic injection molding machine. Therefore, in the above methods, the measurement value of the current or the driving hydraulic pressure can be used instead of the screw driving torque.

Figure 8:
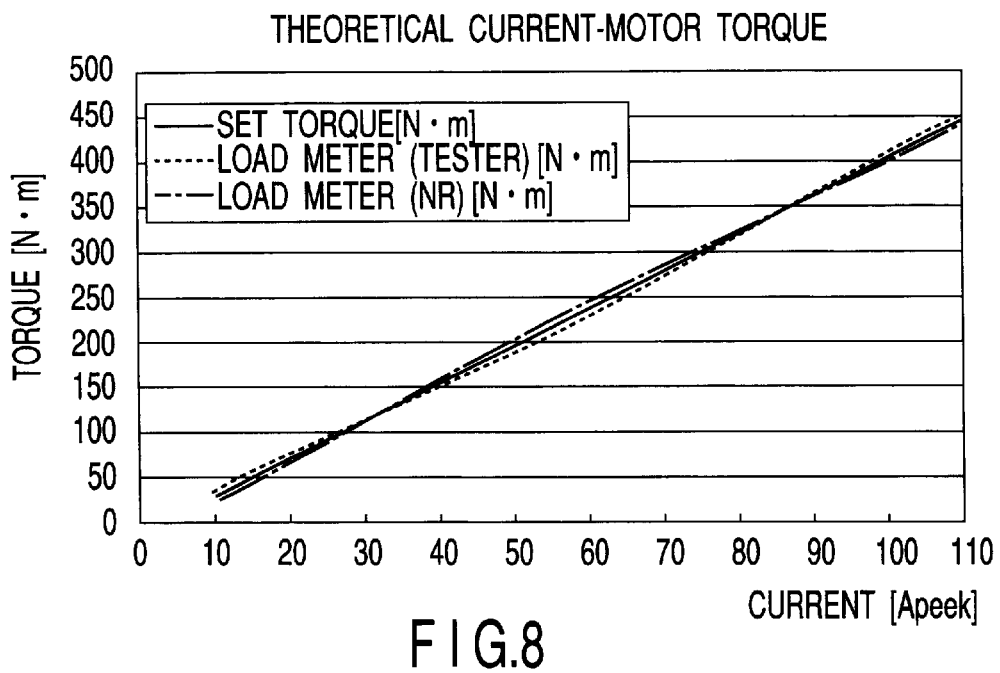
FIG. 8 is a diagram showing the relationship between a current and torque of a screw driving motor.

FIG. 8 shows the relationship between a current and torque of the screw driving motor in the case of the electric injection molding machine shown in FIG. 2.

Figure 9:
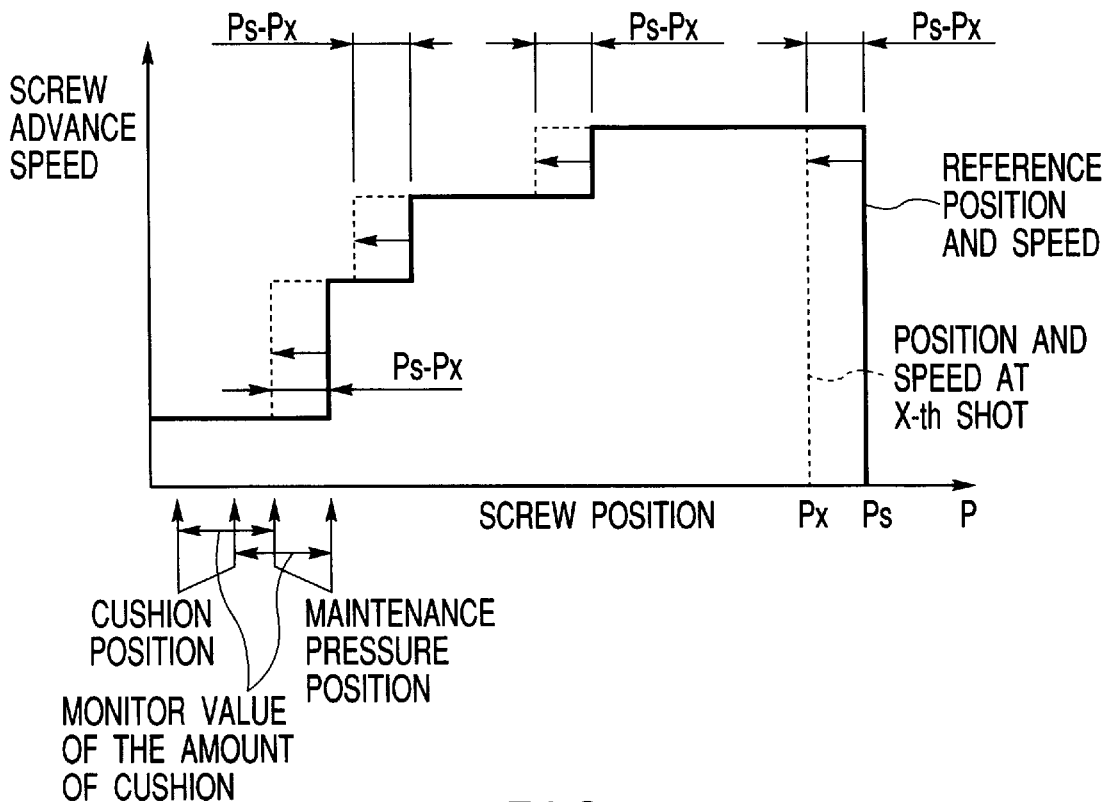
FIG. 9 is a diagram showing a method for shifting the screw advance speed in the injection step in the case where the control method based on the present invention is employed in the charging step.

FIG. 9 shows a method for shifting the screw advance speed in the injection step in the case where the control method based on the present invention is employed in the charging step. In FIG. 9, the solid line represents data showing the relationship between the screw position and the set value of the screw advance speed in the injection step in the case where conforming item was obtained in pilot production. The broken line represents data showing the relationship between the screw position and the set value of the screw advance speed at the X-th shot in the injection step in actual production.

If the control method of the present invention is employed in the charging step, after actual production is started, the retreat complete position (Px) of the screw in the charging step slightly varies at each shot. Therefore, if the relationship between the screw position and the screw advance speed in the injection step is fixed, the quality of the obtained products cannot be stable. To overcome this drawback, according to this embodiment, after actual production is started, the screw position where the set value of the screw advance speed is changed is shifted at each shot with reference to the retreat completion position (Px) in the shot. More specifically, assuming that the retreat completion position where conforming item was obtained in pilot production is Ps and the actual retreat completion position at each shot is Px, the screw position where the screw advance speed is changed is shifted at each shot by Px−Ps from the change position in the pilot production.

Monitoring of the amount of cushion (the screw advance distance in a pressure maintenance step subsequent to the injection step) is carried out by using the distance from the maintenance pressure shift position, which was shifted as described above. As a result, the amount of cushion can be monitored accurately without an influence of a change in retreat completion position of the screw.

According to the present invention, at the end of the charging step, the amount of the molding material stored in the barrel can be controlled accurately. Therefore, the amount of the molding material finally injected into the mold from the barrel can be constant.

With the method for injection molding of the present invention, it is unnecessary to change the set values of the number of revolutions of the screw and the back pressure of the screw as control parameters. Therefore, the properties of the molding material (molten resin) finally injected into the mold from the barrel can be maintained, so long as the temperature of the barrel is kept constant.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for injection molding for introducing and melting molding material in a barrel containing a screw, and thereafter injecting a molten material into a mold, said method comprising the steps of:

carrying out pilot production to collect data showing a relationship between a screw retreat distance from a forward limit and screw driving torque when introducing and melting the molding material in the barrel, and integrating the screw driving torque with respect to the screw retreat distance from the forward limit to a retreat completion position of the screw, thereby obtaining a first integral value;

storing as a reference value the first integral value obtained when a conforming item is produced in the pilot production;

carrying out actual production to measure screw driving torque when introducing and melting the molding material, and integrating in real time the screw driving torque with respect to the screw retreat distance from the forward limit to a screw position at each time, thereby obtaining a second integral value; and monitoring the second integral value, when the second integral value coincides with the reference value, determining that the step of introducing the molding material is completed, and stopping a rotation of the screw.

2. A method for injection molding for introducing and melting molding material in a barrel containing a screw, and thereafter injecting a molten material into a mold, said method comprising the steps of:

carrying out pilot production to collect data showing a relationship between a screw retreat distance from a forward limit and screw driving torque when introducing and melting the molding material in the barrel, and integrating the screw driving torque with respect to the screw retreat distance from a reference position, which is preset near the forward limit, to a retreat completion position of the screw, thereby obtaining a first integral value;

storing as a reference value the first integral value obtained when a conforming item is produced in the pilot production;

carrying out actual production to measure screw driving torque when introducing and melting the molding material, and integrating in real time the screw driving torque with respect to the screw retreat distance from the reference position to a screw position at each time, thereby obtaining a second integral value; and monitoring the second integral value, when the second integral value coincides with the reference value, determining that the step of introducing the molding material is completed, and stopping a rotation of the screw.

3. A method for injection molding according to claim 1, wherein the screw is driven by an electric motor and the screw driving torque is calculated based on a current value of the electric motor.

4. A method for injection molding according to claim 2, wherein the screw is driven by an electric motor and the screw driving torque is calculated based on a current value of the electric motor.

5. A method for injection molding according to claim 1, wherein the screw is driven by a hydraulic motor and the screw driving torque is calculated based on a hydraulic pressure supplied to the hydraulic motor.

6. A method for injection molding according to claim 2, wherein the screw is driven by an electric motor and the screw driving torque is calculated based on a hydraulic pressure supplied to the hydraulic motor.

7. A method for injection molding according to claim 1, wherein when the molding material introduced and melted in the barrel is injected into the mold, a position where an advance speed of the screw is changed is shifted at each shot with reference to the retreat completion position in the step of introducing the molding material.

8. A method for injection molding according to claim 2, wherein when the molding material introduced and melted in the barrel is injected into the mold, a position where an advance speed of the screw is changed is shifted at each shot with reference to the retreat completion position in the step of introducing the molding material.

9. A method for injection molding for introducing and melting molding material in a barrel containing a screw, and thereafter injecting a molten material into a mold, said method comprising the steps of:

carrying out pilot production to collect data showing a relationship between elapsed time from a beginning of retreat of the screw from a forward limit and screw driving torque when introducing and melting the molding material in the barrel, and integrating the screw driving torque with respect to the elapsed time from the forward limit to a retreat completion position of the screw, thereby obtaining a first integral value;

storing as a reference value the first integral value obtained when a conforming item is produced in the pilot production;

carrying out actual production to measure screw driving torque when introducing and melting the molding material, and integrating in real time the screw driving torque with respect to the elapsed time from the forward limit to a screw position at each time, thereby obtaining a second integral value; and monitoring the second integral value, when the second integral value coincides with the reference value, determining that the step of introducing the molding material is completed, and stopping a rotation of the screw.

10. A method for injection molding for introducing and melting molding material in a barrel containing a screw, and thereafter injecting a molten material into a mold, said method comprising the steps of:

carrying out pilot production to collect data showing a relationship between elapsed time from a beginning of retreat of the screw from a forward limit and screw driving torque when introducing and melting the molding material in the barrel, and integrating the screw driving torque with respect to the elapsed time from a reference position, which is preset near the forward limit, to a retreat completion position of the screw, thereby obtaining a first integral value;

storing as a reference value the first integral value obtained when a conforming item is produced in the pilot production;

carrying out actual production to measure screw driving torque in the step of introducing and melting the molding material, and integrating in real time the screw driving torque with respect to the elapsed time from the reference position to a screw position at each time, thereby obtaining a second integral value; and monitoring the second integral value, when the second integral value coincides with the reference value, determining that the step of introducing the molding material is completed, and stopping a rotation of the screw.

11. A method for injection molding according to claim 9, wherein the screw is driven by an electric motor and the screw driving torque is calculated based on a current value of the electric motor.

12. A method for injection molding according to claim 10, wherein the screw is driven by an electric motor and the screw driving torque is calculated based on a current value of the electric motor.

13. A method for injection molding according to claim 9, wherein the screw is driven by a hydraulic motor and the screw driving torque is calculated based on a hydraulic pressure supplied to the hydraulic motor.

14. A method for injection molding according to claim 10, wherein the screw is driven by a hydraulic motor and the screw driving torque is calculated based on a hydraulic pressure supplied to the hydraulic motor.

15. A method for injection molding according to claim 9, wherein when the molding material introduced and melted in the barrel is injected into the mold, a position where an advance speed of the screw is changed is shifted at each shot with reference to the retreat completion position in the step of introducing the molding material.

16. A method for injection molding according to claim 10, wherein when the molding material introduced and melted in the barrel is injected into the mold, a position where an advance speed of the screw is changed is shifted at each shot with reference to the retreat completion position in the step of introducing the molding material.

* * * * *